(No Model.) 3 Sheets—Sheet 2.
D. C. BALL.
BAGGING ATTACHMENT FOR ROLLER COMPRESSES.
No. 602,150. Patented Apr. 12, 1898.
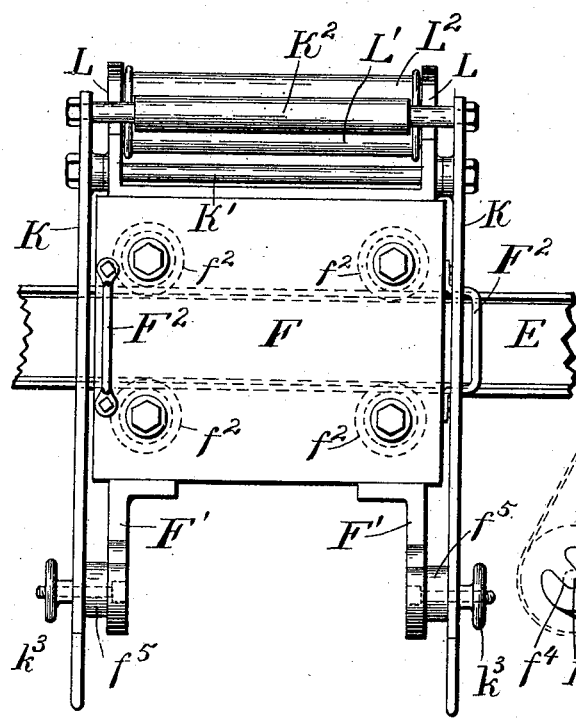
Fig. 3.
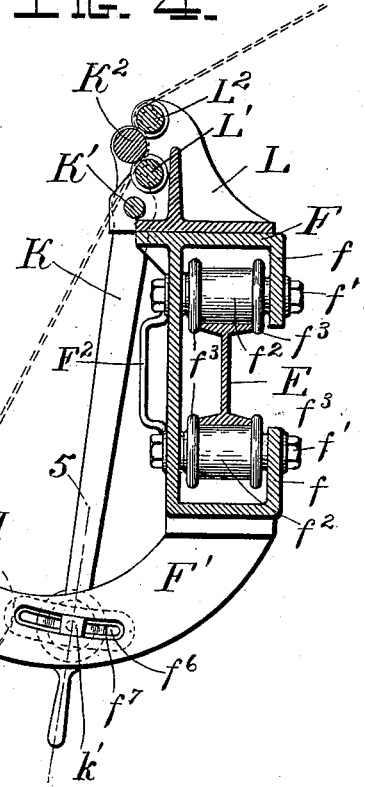
Fig. 4.
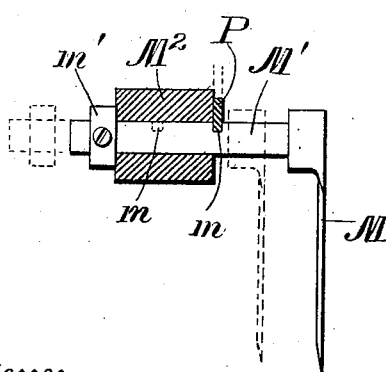
Fig. 6.
Fig. 5.
Witnesses
Percy C. Bowen.
J. Stephen Giusta.
Inventor
D. C. Ball,
by Whitman & Wilkinson,
Attorneys

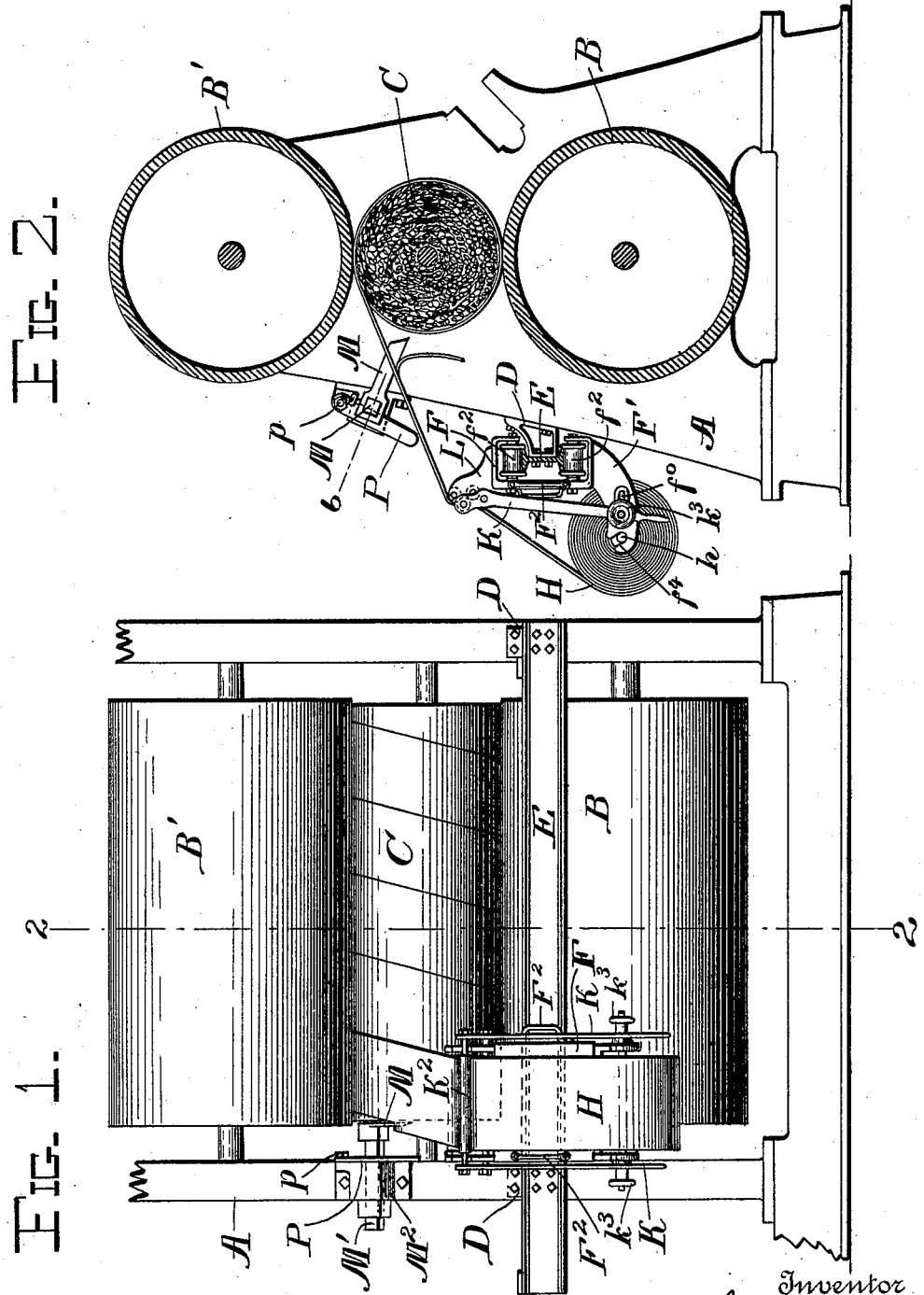

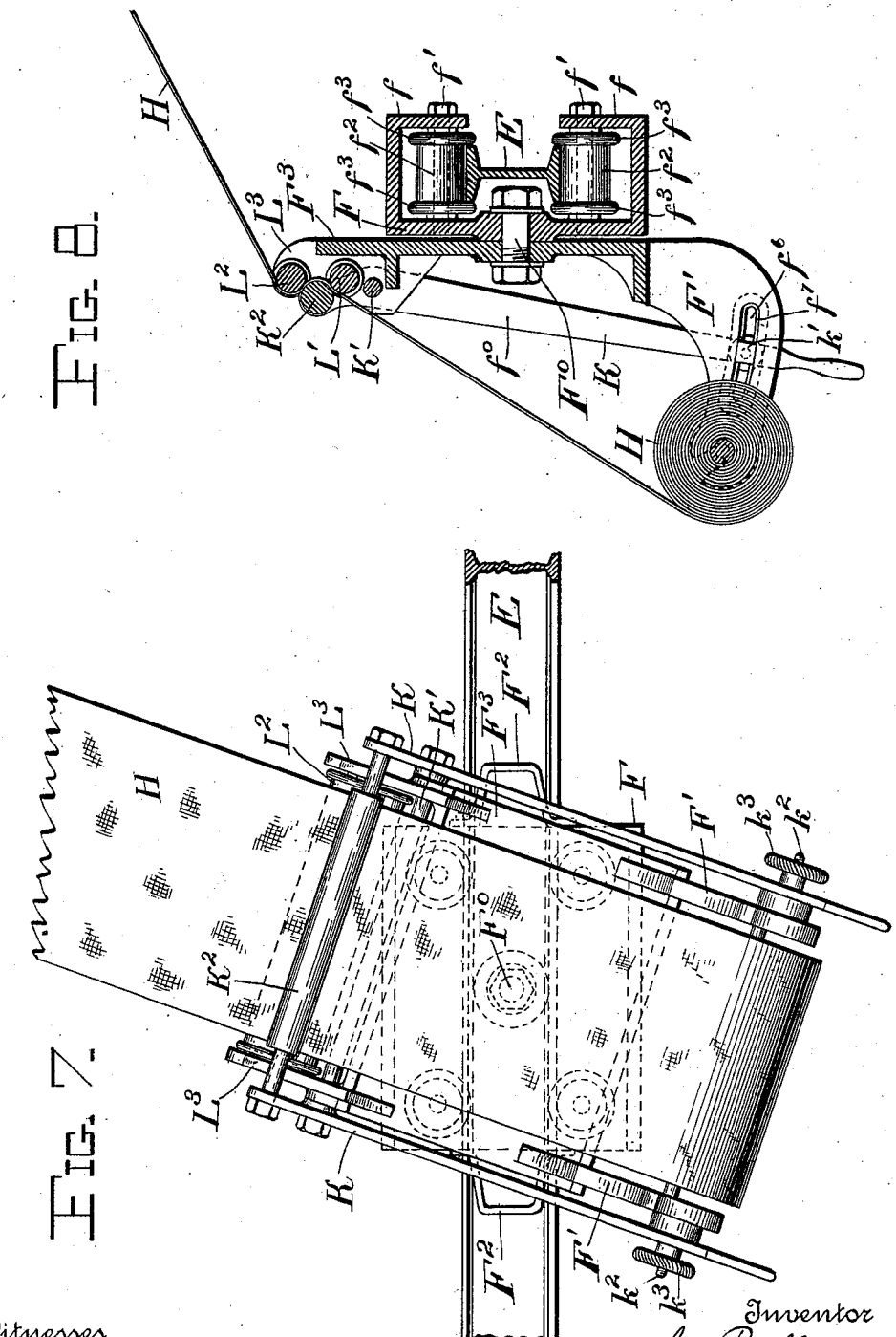

UNITED STATES PATENT OFFICE.

DAVID C. BALL, OF ST. LOUIS, MISSOURI, ASSIGNOR TO THE AMERICAN COTTON COMPANY, OF NEW YORK, N. Y.

BAGGING ATTACHMENT FOR ROLLER-COMPRESSES.

SPECIFICATION forming part of Letters Patent No. 602,150, dated April 12, 1898.

Application filed November 2, 1895. Serial No. 567,744. (No model.)

*To all whom it may concern:*

Be it known that I, DAVID C. BALL, a citizen of the United States, residing at St. Louis, in the State of Missouri, have invented certain new and useful Improvements in Bagging Attachments for Roller-Compresses; and I do hereby declare the following to be a full, clear, and exact description of the invention, such as will enable others skilled in the art to which it appertains to make and use the same.

My invention relates to bagging attachments for roller-compresses; and it consists in providing an improved attachment for the compress by means of which the bagging may be applied to and wound upon the bale when desired.

The said invention will be understood by reference to the accompanying drawings, in which the same parts are indicated by the same letters throughout the several views.

Figure 1 represents a front view of a roller-compress, showing my improved bagging attachment connected thereto. The gearing for driving the rollers and many of the other connected parts are omitted for the sake of clearness in the drawings. Fig. 2 represents a section along the line 2 2 of Fig. 1 and looking to the left. Fig. 3 represents an enlarged detail view of the carriage for the bagging-roll with the said roll detached therefrom. Fig. 4 represents a side elevation of the device shown in Fig. 3 as seen from the left of the said figure. Fig. 5 represents an enlarged detail view of the end of one of the tension-levers and represents the means of adjusting the same. Fig. 6 represents a plan view of the adjustable knife for trimming the edge of the bagging. The bagging herein referred to is preferably a narrow continuous strip of cotton duck, but any other suitable material may be used, if desired. Fig. 7 represents a view similar to that shown in Fig. 3, in which the carriage for the bagging-roll is pivoted to allow the bagging to be fed at the desired angle to the bale; and Fig. 8 represents a central vertical section through the device shown in Fig. 7.

A represents the frame of the compress, in which are journaled the compressing-rolls B and B', between which the cotton bale C is wound up in a continuous bat, as is known in the art of making cylindrical cotton bales.

While I have shown the rollers B and B' as mounted one above the other, it will be obvious that the same may be horizontally disposed, if desired, and that the axes of the said rollers and of the bale in process of forming may be all in approximately the same horizontal plane instead of in the same vertical plane, as shown, if desired.

D represents one of a pair of brackets connecting the frame A with the I-rail E, on which the carriage is mounted. This rail E projects beyond one side of the frame A, so that the said carriage may be run out beyond the edge of the frame, as would be required in winding on the last length of the bagging. This carriage consists of a plate F, having the ends bent over, as at $f$, to receive the bolts $f'$, on which the rollers $f^2$ are journaled, which rollers are provided with flanges $f^3$, fitting on either side of the top and bottom flanges of the I-rail E, and thus while the carriage is free to slide longitudinally along the said rail it is steadied against any force tending to lift it off of the said rail. To the lower portion of the said plate two curved arms F' are secured, which arms are slotted, as at $f^6$, and shouldered, as at $f^7$, to receive the square necks $k$ and the square heads $k'$ of the screw-threaded bolts $k^2$, which pass through the bosses $f^5$ on the arms F' and through openings in the hand-levers K and are clamped in position by means of the thumb-nuts $k^3$, as shown most clearly in Figs. 3 and 5.

The bagging is placed on the carriage in the form of a roll H, journaled on the core $h$, which rests in the jaws $f^4$, as shown in Figs. 2 and 4. The end of the bagging leading from the roll passes over the tension-roller L', journaled in the bracket L, fast to the carriage, then under the roller K², which is journaled in the ends of the hand-levers K, which levers are pivoted upon the rod K', and then over the second tension-roller L², from whence it normally hangs down, except when fed to the finished bale. It will be seen that by moving the hand-levers K out or in and by adjusting them in this position by means of the thumb-nut $k^3$ the tension of the bagging as it is fed to the bale may be regulated at will.

In the form of device shown in Figs. 1 to 4 the bagging is led out at an angle from the roll, but it would ordinarily be preferable to have the bagging fed out at directly from the roll, so as to be wound smoothly upon the bale, and for this reason the journal of the bagging-roll should be either set at an angle or swiveled upon the sliding truck, or the guide-rail itself may be set at an angle and the bagging-roll may be journaled thereon parallel to the said rail. This inclination of the axis of the bagging-roll may be accomplished in a variety of ways, one of which is shown in Figs. 7 and 8. The construction shown in these figures differs from that shown in Figs. 1 to 4 mainly in having a separate plate $F^3$ swiveled on the king-bolt $F^0$, connected to the frame F, in which the rollers $f^2$ are journaled. This plate $F^3$ carries the arms $F'$, similar to those already described with reference to Figs. 1 to 6, and also the plate $L^3$, in which the tension-rollers are journaled, which are operated as already described.

The swiveled carriage may be set at any desired angle by screwing down upon the nut $f^0$.

In practice this bagging is fed spirally on the bale, as shown in Fig. 1, when the process of winding the bat up has been completed and it is desired to cover the circumference of the bale. To do this, the carriage is moved down to the right-hand end of the bale, as shown in Fig. 1, (for convenience in moving the said carriage handles $F^2$ are provided,) and the bagging is wound on the bale by the simple rotation of the bale, the feed of the bat thereto being discontinued. The carriage is moved along to the left until the whole circumference of the bale is covered with the bagging, laid on spirally, as shown in Fig. 1, each one of the spiral widths overlapping somewhat the width to the right thereof. When the bale is nearly covered, the bagging may be either cut at angle with a knife by hand or automatic means may be provided for slicing off the edge of the bagging, such means, for instance, as are shown in Figs. 1, 2, and 6, where M represents a knife mounted on a sliding shaft $M'$, sliding in bearings $M^2$, rigidly attached to the frame A. This shaft $M'$ is provided with a groove $m$ to receive the holding-bar P, which is pivoted at $p$. When this knife is moved out into the position shown in Fig. 1 and by the full lines in Fig. 6, it trims the edge of the bagging close to the bale, as shown in Fig. 1, in which position the bar P engages in the groove $m$ and holds the knife out in the operative position. The knife may be moved back out of engagement by lifting the bar P and sliding the knife back to the position indicated by dotted lines in Fig. 6. It will be seen that the selvage edge of the bagging cut by the knife M in finishing one bale will be just the right shape for applying to the opposite edge in beginning the covering of the next bale. When the circumference of the bale is covered and before the bale is removed from the press the edges of the bagging near the last end are caught with a few stitches of a twine-needle or are otherwise secured in any convenient way, and then the bale is taken out of the press preparatory to removing the core and placing on the end coverings.

By the herein-described device the bagging is conveniently carried on the framework of the press, is readily applied under the proper tension, is automatically cut, and the whole process of applying the bagging to the circumference of the bale is rapidly and economically accomplished.

The various other advantages of the herein-described construction would readily suggest themselves to any one skilled in the art.

I do not desire to limit myself to the various details of construction or to the precise combination and arrangement of parts herein described, as many modifications would readily suggest themselves to any one skilled in the art which could be used without departing from the spirit of my invention.

I do not claim as my invention the combination, with a roller-compress, of a carriage mounted to travel lengthwise of the bale formed therein and adapted to carry a roll of bagging to be wound spirally upon the bale, with or without devices for applying tension to the bagging.

Having thus described my invention, what I claim, and desire to secure by Letters Patent of the United States, is—

1. The combination with a roller-compress, of a traveling carriage and means for journaling a roll of bagging thereon, and an adjustable knife adapted to trim the said bagging from the end of the covered bale, substantially as described.

2. The combination with a roller-compress, of a traveling carriage and means for journaling a roll of bagging thereon, of a knife rigidly attached to the frame of the compress, and adapted to trim the bagging along the end of the finished bale, substantially as described.

3. In a roller-compress, the combination with a traveling carriage and means for guiding the same from one end of the core-roll to the other, of means for journaling a roll of bagging on said carriage, to be fed to the core-roll, and means for automatically trimming the said bagging along the end of the finished bale, substantially as described.

4. In a roller-compress, the combination with a traveling carriage and means for guiding the same from one end of the core-roll to the other, of means for journaling a roll of bagging on said carriage to be fed to the core-roll, and a knife rigidly attached to the frame of the compress and adapted to trim the bagging along the edge of the finished bale, substantially as described.

5. The combination with a roller-compress, of a traveling carriage, means for journaling a roll of bagging on said carriage to be fed to the core-roll, tension devices interposed between said roll of bagging and said core-roll, and means for automatically trimming the said bagging along the edge of the covered bale, substantially as described.

6. The combination with a roller-compress, of a traveling carriage, means for journaling a roll of bagging on said carriage to be fed to the core-roll, tension devices interposed between said roll of bagging and said core-roll and a knife adapted to trim the edge of said bagging along the edge of the covered bale, substantially as described.

7. In a roller-compress, the combination with a traveling carriage and means for guiding the same from one end of the core-roll to the other, and means for journaling a roll of bagging on said carriage to be fed to the core-roll, tension devices interposed between said roll of bagging and said core-roll, and a knife rigidly attached to the frame of the compress and adapted to trim said bagging along the edge of the covered bale, substantially as described.

8. In a roller-compress, the combination with an I-rail secured to the frame of the press and approximately parallel to the axes of the rolls, of a carriage traveling on said I-rail, with rollers engaging the upper and lower flanges of said rail, means for journaling a roll of bagging on said carriage, to be fed to the core-roll, tension devices carried by said carriage, and interposed between said bagging-roll and said core-roll, and means for automatically trimming said bagging along the edge of the covered bale, substantially as described.

9. In a roller-compress, the combination with an I-rail secured to the frame of the press, and approximately parallel to the axes of the rolls, of a carriage traveling on said I-rail with rollers engaging the upper and lower flanges of said rail, means for journaling a roll of bagging on said carriage to be fed to the core-roll, tension devices carried by said carriage and interposed between said bagging-roll and said core-roll, and a knife rigidly attached to the frame of the compress, and adapted to trim the said bagging along the edge of the covered bale, substantially as described.

10. In a roller-compress, the combination with a rail secured to the frame of the press, and approximately parallel to the axes of the rolls, of a carriage traveling on said rail, means for journaling a roll of bagging on said carriage to be fed to the core-roll, tension devices interposed between said roll of bagging and said core-roll, and means for automatically trimming the said bagging along the edge of the covered bale, substantially as described.

11. In a roller-compress, the combination with a rail secured to the frame of the press and approximately parallel to the axes of the rolls, of a carriage traveling on said rail, means for journaling a roll of bagging on said carriage to be fed to the core-roll, tension devices interposed between said roll of bagging and said core-roll, and an adjustable knife mounted in the framework of the compress and adapted to trim the said bagging along the edge of the covered bale, substantially as described.

12. The combination with a roller-compress, of a swiveled traveling carriage, means for journaling a roll of bagging carried thereon, and an adjustable knife adapted to trim the said bagging from the end of the covered bale, substantially as described.

13. In a roller-compress, the combination with a traveling carriage and means for guiding the same from one end of the bale in the press to the other, of means for journaling a roll of bagging on said carriage to be fed to the bale, and having its axis at an angle to the axis of the bale, and means for automatically trimming the said bagging along the ends of the finished bale, substantially as described.

14. In a roller-compress, the combination with a rail secured to the frame of the press, and approximately parallel to the axes of the rolls, of a carriage traveling on said rail, with a support for a roll of bagging swiveled thereon, means for feeding the said bagging under tension to the bale in the press, and means for automatically trimming the said bagging along the edge of the covered bale, substantially as described.

In testimony whereof I affix my signature in presence of two witnesses.

D. C. BALL.

Witnesses:
 J. M. HOLMES,
 FRANCIS G. EATON.